Oct. 23, 1962  J. L. BEISWENGER  3,060,407
DIRECTION SIGNALS FOR TRAILERS
Filed March 22, 1961  3 Sheets-Sheet 1
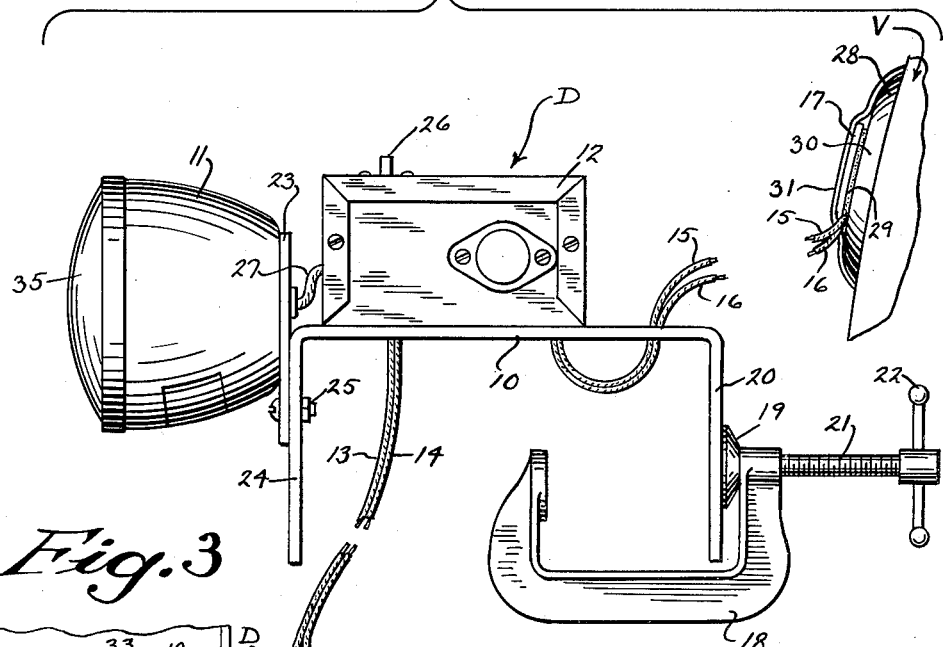
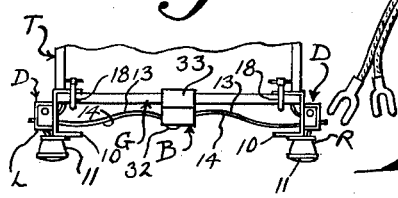
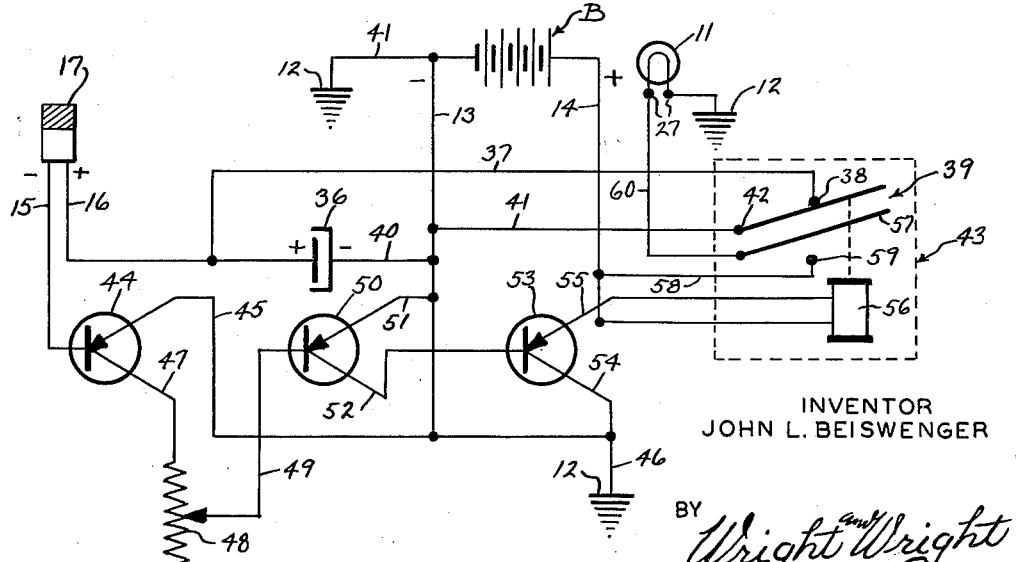
INVENTOR
JOHN L. BEISWENGER
BY *Wright and Wright*
ATTORNEYS Oct. 23, 1962     J. L. BEISWENGER     3,060,407

DIRECTION SIGNALS FOR TRAILERS

Filed March 22, 1961     3 Sheets-Sheet 2

INVENTOR
JOHN L. BEISWENGER

BY *Wright and Wright*

ATTORNEYS

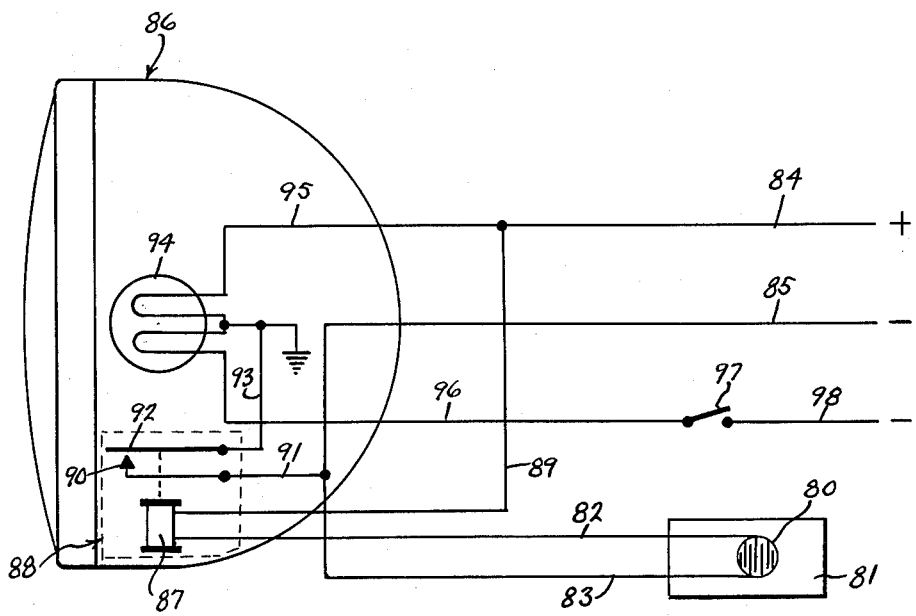

United States Patent Office 3,060,407
Patented Oct. 23, 1962

3,060,407
DIRECTION SIGNALS FOR TRAILERS
John L. Beiswenger, Milwaukee, Wis., assignor to The Fulton Company, Milwaukee, Wis., a corporation of Wisconsin
Filed Mar. 22, 1961, Ser. No. 97,697
3 Claims. (Cl. 340—84)

This invention appertains to vehicle lights, and more particularly to a novel direction indicator for trailers, which is also useful as a brake light and a running light when desired.

In most States it is now mandatory to have an illuminated rear trailer light for trailers and many States are now enacting laws to have the trailers provided with direction signal lights, or semaphores, and are also considering brake indicating lights. The illuminated running light for trailers has already been provided and usually includes a small electric battery which can be hooked on the rear of the trailer, and is in circuit with a red light or the like. However, the provision of direction signal lights, brake indicators and the like, is causing the owners of small trailers much difficulty. In an effort to solve this problem, wires have to be brought forwardly from the trailer, and hooked into the wiring system of the automobile, or alternatively an elaborate battery operated system must be provided in the trailer, and still some means, controlled in the forward end of the automotive vehicle, must be installed to operate the same to indicate the direction of turn.

It is therefore a primary object of my present invention to provide a direction signal light or lights for trailers which is responsive to the directional system of the automotive vehicle, but which does not need wires connecting the same directly to the vehicle wiring system.

Another important object of my present invention is to provide a compact battery operated light employing a light sensitive element, i.e., a solar battery, which is responsive to the rear directional signals of the automotive vehicles, and which also can be utilized at will to respond to the brake lights and even the running lights of the vehicle.

A salient feature of my invention resides in the provision of a compact lighting arrangement which can be clamped to the rear of the trailer so as to respond to the directional signal of the automotive vehicle and wherein this compact light can be provided in pairs so as to indicate a right or left hand turn as desired.

Still another object of my present invention is to provide a pair of lights each identical to the other, so that each one can be clamped on either side of a trailer and wherein each is provided with a novel electrical circuit adapted to be connected to a small battery and sensitive and responsive to the directional signals of the automotive vehicle and which as previously mentioned may also be made to be responsive to the brake light and/or the running lights of the vehicle.

A further object of my present invention is to provide a different circuit for each different type of light-sensitive element used (solar battery) and to eliminate in one form of my circuit all transistors and to enclose this circuit completely within the trailer light housing.

A still further object of my invention is to provide simple, practical and reliable constructions that are economical to manufacture, easy to assemble and positive in their operation.

With the above and other objects in view, which will more readily appear as the nature of the invention is better understood, the same consists in the novel construction, combination and arrangements of parts hereinafter more fully described, illustrated and claimed.

A preferred and practical embodiment of my invention is shown in the accompanying drawings, in which FIGURE 1 is a side elevational view of one form of my novel direction signals, illustrating one signal, and the same is shown associated with one direction signal indicator of an automotive vehicle;

FIGURE 2 is a schematic diagram of the electrical circuit utilized with the signal shown in FIGURE 1 of the drawings;

FIGURE 3 is a reduced top plan view showing the direction signal as illustrated in FIGURE 1 of the drawings associated with a trailer on both sides thereof;

Figure 6:
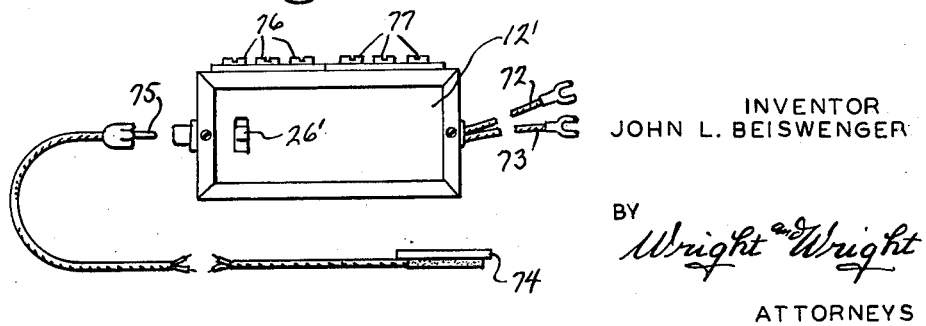

FIGURE 6 is a side elevational view of a modification in the box or housing carrying the circuit, the modification including two complete circuits (for the left and right-hand lights) housed in the same box or casing; and FIGURE 7 is a schematic diagram illustrating a circuit having no transistors and showing how the entire circuit including the relay can be contained within the trailer light itself.

It should be here noted that actually FIGURES 1 through 7 illustrate the development and adaptation of the invention in relation to different types of solar batteries available. These figures further show the development from a solar battery that requires considerable amplification (FIGURES 1 to 3 inclusive) to a new type (FIGURE 7) that requires no amplification, thus eliminating all transistors and enabling the relay and circuit to be contained completely within the trailer light.

Referring now to the drawings in detail, wherein similar reference characters designate corresponding parts throughout the several views, the letter D generally indicates one of my novel direction lights and it is to be understood that the same is provided in pairs and each is identical one with the other.

In FIGURES 1 to 3 inclusive the direction signal D broadly includes a bracket 10 upon which is mounted the light 11, the box 12 housing the majority of the electrical circuit, wires 13 and 14 adapted to be attached to the leads of a battery, and the wires 15 and 16 at the extreme outer end of which is the light sensitive element 17 usually referred to as a solar battery. A U-shaped clamping member 18 is provided to clamp the bracket 10 to the trailer and the foot 19 thereof secures the leg 20 of the bracket to its support. A threaded post 21 is loosely held to the shoe 19 and is rotated by means of the handle portion 22. The U-shaped clamping jaw 18, of course, is free to turn and swivel on the post 21 so that the bracket 10 can be attached to the rear gate G of a trailer T as shown more particularly in FIGURE 3 of the drawings.

The light 11 is mounted on the bracket 10 by means of a flat plate 23 which is bolted or otherwise secured to the leg 24 of the bracket by means of the bolt and nut arrangement 25. The box or casing 12 which houses the electrical circuit, as shown in FIG. 2 of the drawings, is also provided with an "On" and "Off" switch 26, and of course, the light is wired in circuit through the wires 27 leading to the box 12. The light sensitive element 17 or solar battery is adapted to be attached in any manner to the rear directional signal 28 of the vehicle V and in the preferred form the same is attached by means of an adhesive 29 and can be attached to the outside casing of the light 30 or may be provided with a protective covering 31 as shown in FIGURE 1 of the drawings. It is also to be understood that this light sensitive element or solar battery 17 can be so formed as to fit the various shaped lights now found in modern vehicles, and in some instances wherein the brake light and directional signal light are both housed within the same casing, it should be obvious that this light sensitive element will respond not only to the flickering of the directional signal but also the application of the brakes, as indicated through the turning on and off of the brake light.

Primarily, of course, my novel light is designed as a semaphore or direction signal indicator, and is therefore directly responsive to the flickering of its respective direction indicator mounted on the vehicle. Noting FIG. 3 of the drawings, and as previously mentioned, my novel light arrangement D will be provided in pairs, one mounted on the left hand side L and one mounted on the right hand side R of the trailer. Obviously, the light sensitive element 17 of the left hand light will be secured to the left hand direction signal indicator and the right hand light R will have its light sensitive element secured to and responsive to the right indicating signal of the vehicle. Both lights, however, are identical, and each has its elements 13 and 14 secured to the battery B and in this instance, I have shown the battery B as being provided with a running light 32 and mounted on a bracket 33 which hooks over the tail gate G of the trailer T.

Now referring more particularly to FIGURE 2 of the drawings wherein I have illustrated my novel circuit for operating the light 11, it can be seen that the light sensitive element or solar battery 17 is indicated by the same numeral in both FIGURES 1 and 2, and all like wiring that can be seen in FIGURE 1 of the drawings is so indicated and therefore the battery B shown in FIGURE 3 is likewise indicated by the letter B in FIGURE 2 of the drawings.

This battery can be of any voltage but it is desirable that the same be from 6 to 7.5 volts direct current. Further, it should be noted that several of the leads are grounded either through the casing 12 or the light casing 35 and these grounds are so marked in the diagram. The light sensitive element 17 is of the photo cell type, and is sensitive to and reacts to various intensities of light, causing an electric current to be generated through the circuit. In any event, the lead 15 is the negative lead and lead 16 is the positive lead. The positive lead or line 16 goes to the positive side of a capacitor 36 and this capacitor 36 is bridged by a line 37 which is directly connected to one leg 38 of the double relay 39. It should be noted at this point that the capacitor is important, in that, when it is not charged it is a short circuit. The negative side of the capacitor through a lead wire 40 is connected to the negative line 13 which in turn is grounded through wire 41 to the casing 12, as shown. Further connected to the wire 13 is a wire or lead 41 connected directly to the terminal 42 of the leg 38 of the double relay 39. The relay 39 in general is of the coil type 43, as indicated by the dotted line. The negative line 15 is fed into the power transistor 44, one lead of which 45 is connected to the grounded line 46, and this is also grounded by means of the casing 12. The other lead 47 of the power transistor 44 leads to a variable resistor which is in the nature of a hand controlled and adjustable potentiometer 48 and this can be utilized to adjust the circuit in accordance with the brilliancy of the automotive vehicle signal light. One lead of this variable resistor or potentiometer 49 is connected to the power transistor 50 and here it should be noted that through a line 51 a portion of this transistor is connected to the ground through wires 45 and 46, and the other lead 52 leads into the third power transistor 53. This transistor 53 also is grounded through the lead or wire 54. Wire 55 of power transistor 53 leads directly to the coil 56, as shown, and obviously when a current is generated by means of the sensitive element or solar battery 17, the coil will be excited and power from the battery is connected to the coil through the line 14 as shown, and this of course is the plus side of the battery. In the position shown, the double relay is open and the circuit therefore is not closed to the light 11 and no current flows through the lead 60 from leg 57 of the relay to the light 11. Connected to the positive line 14 is a line 58 ending in a terminal or contact point 59, and when the coil 56 is excited, it will move the relay 39 so that the leg 57 thereof makes contact with the terminal or contact point 59 and electric current then flows directly from the battery B through lines 14 and 58, terminal 59, leg 57 and line 60 to the light, and the light will be energized and lit. When a decrease in current is had through the light sensitive element 17 the relay will move to the position shown in FIGURE 2, and no current will be fed to the light 11 and the light will go out and capacitor 36 when not charged acts as a short circuit for the current and thus aid greatly in responding to changes in the light intensity of a signal light of an automotive vehicle.

From the foregoing, it can be seen that I have provided a novel direction signal light arrangement for trailers and that the circuit shown in FIGURE 2, as well as the light shown in FIGURE 1, are provided in duplicate to give a left and right hand direction indication, as illustrated in FIGURE 3 of the drawings.

Figure 4:
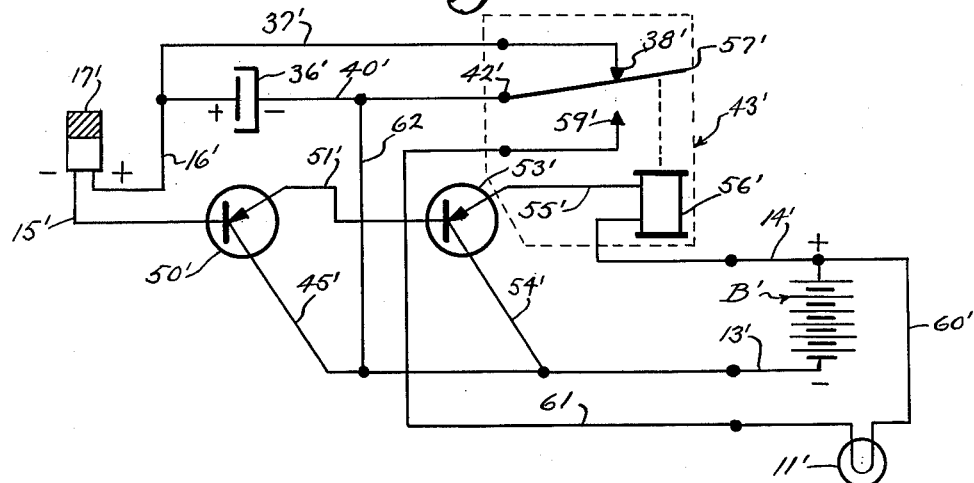
FIGURE 4 is a schematic diagram of an alternate electrical circuit eliminating one transistor and also eliminating the variable resistor.

If a more sensitive solar battery is utilized, I may employ the circuit shown in FIGURE 4 of the drawings and this circuit is similar to that shown in FIGURE 2 except that I have eliminated one transistor, the variable resistor 48 and have improved the coil relay 43 to help lower the cost.

The reference numerals utilized in describing FIGURE 4 will be the same for similar parts of the circuit described in FIGURE 2 except that they will be primed.

Therefore, 17' refers to the light sensitive element or photocell and again, this photocell has a negative lead wire 15' and a positive lead wire 16'. The battery leads are again indicated by the numerals 13' and 14'. As previously mentioned, one of the transistors 44 is eliminated in this circuit and therefore, the negative lead wire 15' connects directly to the plate of the transistor 50', one lead of which 51' connects to the plate of the next transistor 53'. The other lead 45' connects directly to the negative side of the battery B' and to lead 13'. From transistor 53', one lead 55' connects to the coil 56' of the relay set-up 43' and a lead 54' connects to the battery lead wire 13' on the negative side of the battery. The light 11' has one lead wire 60' directly connected to the positive side of the battery and another lead wire 61 connected to the contact point 59' of a single-acting or pole relay switch 57'. Line 16' leads into the positive side of the capacitor 36' and a line 40' leads from the negative side of the capacitor to terminal 42' of the relay switch 57'. Further, a bridge wire 62 is provided between the line 40' and the line 13' as shown. Further, it should be noted that capacitor 36' is in turn bridged by line 37' which is directly connected to terminal 38' of the single relay. Thus, it can be seen that when the light sensitive element or solar battery 17' is energized, current will flow and be amplified by means of the transistors 50' and 53' and coil 56' will be excited. It will then attract or move the relay leg 57' to make contact with terminal 59' and a completed circuit through the light 11' from the positive to the negative side of the battery will be closed. Thus the light 11 will be lit in direct response to the fluxation of the current generated by the light sensitive element 17' and the resultant movement of the leg 57' of the relay.

Figure 5:
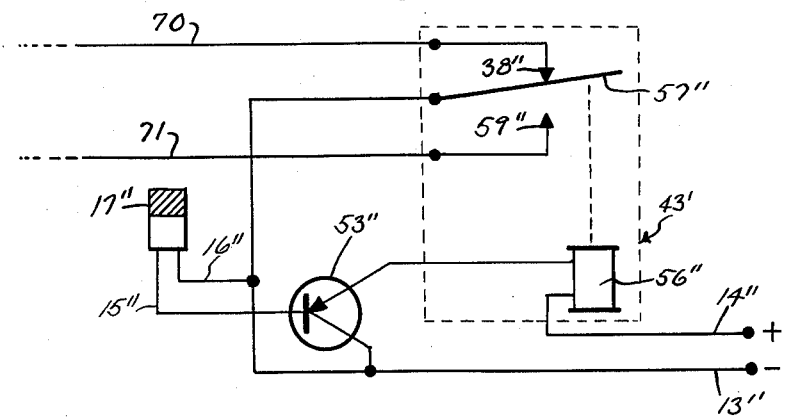
FIGURE 5 is a schematic diagram of another circuit eliminating two transistors.

FIGURE 5 of the drawings represents a schematic diagram wherein two transistors 44 and 50 have been eliminated and only one transistor 53" is utilized in the circuit and again, similar reference numerals have been used where applicable. For example, the leads to the battery are 13″ and 14″ and the battery as well as the light 11 is not shown in this diagram but are connected in the same manner as that illustrated in FIGURE 4 of the drawings and the relay leg 57″ as well as contact points 59″ and 38″ are the same and when current is generated in the light sensitive element 17″ the coil 56″ will be excited and will attract the leg 57″ to contact point 59″ to complete the circuit through the light. In this particular application, additional leads may be provided if desired, as indicated by the numerals 70 and 71, to running lights and brake lights respectively.

If desired, and particularly where a smaller circuit is utilized such as shown in FIGURE 5 of the drawings, I may house the circuits for both the left and right hand lights in one casing and this is illustrated in FIGURE 6 of the drawings, wherein the box 12′ includes two complete circuits and is provided with the leads 72 and 73 for the battery and in this particular instance, I provide a pair of photoelectric cells, only one of which is shown and indicated by the numeral 74 and these elements are connected by a phono-jack and plug arrangement 75 which places them in circuit. The pairs of screw terminals indicated by the numerals 76 and 77 respectively connect the respective trailer lights, i.e., 76 could be for the left hand trailer light and 77 for the right hand trailer light. The extra terminal in each instance could be utilized for running or brake lights if desired, and I also provide an on-and-off switch 26′ as shown.

Due to the fact that a new highly sensitive type of photoelectric cell is now available on the market, which cell generates enough current to actuate a relay without amplification, I have also been able to develop a very small compact circuit which entirely eliminates all transistors, variable resistors, etc. This schematic circuit, as well as the fact that the circuit can be housed within the light casing itself, has been illustrated in FIGURE 7 of the drawings and attention is directed thereto.

In this form of the invention, the light sensitive element 80 is fixed to an envelope 81 and this envelope is in turn attached to the rear directional signal indicator of the automobile. It should be kept in mind that except for leads 82 and 83 which are connected directly to the light sensitive element 80 and leads 84 and 85 which lead to the plus and minus sides respectively of the battery, the light circuit is contained within the trailer light casing 86 and obviously, this particular arrangement is both simpler and more economical to manufacture than the others shown. However, the others are an important step in the art since they must be utilized where the light sensitive element is not as improved as that element disclosed in FIGURE 7 of the drawings. Lead 82 of the light sensitive element 80 is connected directly to the coil 87 of the relay 88 and another lead 89 connects the relay 87 with the positive side of the battery through wire 84. The wire 83 of the light sensitive element 80 is directly connected to the negative side of the battery through lead wire 85. Contact point 90 is also connected in circuit with the negative side of the battery and lead wire 83 by means of the wire 91. The movable leg 92 of the single acting relay is connected both to the light circuit and to ground through line 93 and one end of the light filament 94 is connected directly to the positive side of the battery through wires 95 and 84. I may also provide an aditional lead from the light 94 indicated by the numeral 96 which is in turn provided with a switch 97 and thence is connected to the negative side of the battery through wire 98. Obviously, when switch 97 is closed, the circuit will be completed and light 94 can be utilized as a running light. However, when the switch 97 is open as shown in FIGURE 7, the light 94 will then respond directly to the current generated by the light sensitive element 80 in that the coil 87 will be excited causing switch leg 92 to close circuit with contact point 90, and thus, current will flow from the positive side of the battery directly through to the negative side of the battery to light the filament 94. The casing 86 of the trailer light can be mounted on the trailer in any desired manner by using a bracket or it is even contemplated that the same could be built into the trailer with the additional leads 82, 83, 84 and 85 extending from the light casing as indicated.

What I claim as new is:

1. A light attachment for trailers responsive to a rear signal light of an automotive vehicle, and comprising, a bracket adapted to be mounted on the rear of the trailer, a readily visible light mounted on said bracket, and an electric circuit housing carried by said bracket, the circuit including a light sensitive photo cell element having positive and minus leads connected thereto, the positive lead being directly connected to one leg of a double relay and also connected to the positive terminal of a capacitor, one leg of said capacitor being the negative leg and connected to the negative ground side of a battery, the minus lead from said light sensitive element extending into a power transistor, one leg of said power transistor being grounded and the other leg leading to another power transistor, one leg of said second power transistor being grounded and the other leg leading to a third power transistor, one leg of said third power transistor being grounded and the other leg leading to a coil for exciting and attracting said relay, said relay connected to a light, one side of said light being grounded, the relay in one position disconnecting said light from said circuit and in another position through said coil moving to place said light in circuit with said battery in direct response to the light intensity received through said light sensitive element, and a hand controlled potentiometer and variable resistor placed between two of said power transistors to vary the resistance to the current according to the brilliancy of the automotive vehicle signal light.

2. A signal light for trailers responsive to a rear signal light of an automotive vehicle, and comprising, a light sensitive photo cell element mounted on the trailer and having a positive lead and a minus lead, the positive lead being directly connected to one leg of a double relay and also connected to the positive terminal of a capacitor, one leg of said capacitor being the negative leg and connected to the negative ground side of a battery, the minus lead from said light sensitive element extending into a power transistor, one leg of said power transistor being grounded and the other leg leading to another power transistor, one leg of said second power transistor being grounded and the other leg leading to a third power transistor, one leg of said third power transistor being grounded and the other leg leading to a coil for exciting and attracting said relay, said relay connected to a rear trailer light, one side of said light being grounded, the relay in one position disconnecting said light from said circuit and in another position through said coil moving to place said light in circuit with said battery in direct response to the light intensity received through said light sensitive element, and a hand controlled potentiometer and variable resistor placed between two of said power transistors to vary the resistance to the current according to the brilliancy of the automotive vehicle signal light.

3. A signal light for trailers responsive to a rear light of an automotive vehicle, and comprising, a readily visible signal light adapted to be mounted on the rear of the trailer, an electric circuit for actuating said trailer light including a light sensitive photo cell having positive and minus leads, said positive lead being connected to one leg of a double relay and to the positive terminal of a capacitor, the other terminal of which is connected to the negative side of a battery, and said minus lead extending into a power transistor, one leg of which is grounded while its other leg is connected to a second power transistor, one leg of which is also grounded while its other leg is connected to a third power transistor, one leg of which is likewise grounded while its other leg is connected to an exciting coil for said relay, said relay being connected to said trailer light, one side of which is grounded, and the relay in one position disconnecting said light from said circuit and in another position placing said light in circuit with said battery in response to light intensity received through said light sensitive cell, and a potentiometer for varying the resistance to current flow in accordance with the brilliancy of the automotive vehicle signal light.

References Cited in the file of this patent

UNITED STATES PATENTS

| | | |
|---|---|---|
| 2,771,594 | Gourdou | Nov. 20, 1956 |
| 2,844,760 | Rabinow | July 22, 1958 |
| 2,974,304 | Nordlund | Mar. 7, 1961 |